United States Patent
Kokel et al.

(12) 
(10) Patent No.: US 6,335,397 B1
(45) Date of Patent: *Jan. 1, 2002

(54) DISPERSIONS CONTAINING A POLYURETHANE AND A RADIATION-HARDENABLE PREPOLYMER

(75) Inventors: Nicolas Kokel, Alleins (FR); Klaus Menzel, Ludwigshafen; Wolfgang Reich, Maxdorf, both of (DE)

(73) Assignee: BASF Aktiengesellschaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/403,006

(22) PCT Filed: Apr. 2, 1998

(86) PCT No.: PCT/EO98/01943

§ 371 Date: Oct. 15, 1999

§ 102(e) Date: Oct. 15, 1999

(87) PCT Pub. No.: WO98/47975

PCT Pub. Date: Oct. 29, 1998

(30) Foreign Application Priority Data

Apr. 17, 1997 (DE) .......................... 197 16 020

(51) Int. Cl.⁷ .............................. C08J 3/00; C08K 3/20; C08L 75/00; C08F 8/30; C08G 18/00
(52) U.S. Cl. ........................ 524/507; 524/591; 524/457; 524/839; 524/840; 525/123; 525/455
(58) Field of Search ................................. 524/507, 591, 524/839, 840, 457; 525/123, 455

(56) References Cited

U.S. PATENT DOCUMENTS 4,098,743 A * 7/1978 Scriven et al. ........ 260/29.2 TN
5,945,473 A * 8/1999 Kielbania ................... 524/457

FOREIGN PATENT DOCUMENTS

DE            4031732 A     *   4/1992

* cited by examiner

*Primary Examiner*—Patrick D. Niland
(74) *Attorney, Agent, or Firm*—Oblon, Spivak, McClelland, Maier & Neustadt, P.C.

(57) ABSTRACT

Aqueous dispersions which are essentially free from protective colloids or emulsifiers, comprise, in dispersed form, A. a polyurethane (A) comprising hydrophilic groups, which bring about the water-dispersibility of the polyurethane, this polyurethane (A) being essentially free from C—C double bonds, and B. a prepolymer having a content of from 0.1 to 1 mol of free-radically polymerizable C—C double bonds per 100 g of prepolymer.

10 Claims, No Drawings

DISPERSIONS CONTAINING A POLYURETHANE AND A RADIATION-HARDENABLE PREPOLYMER

The present invention relates to aqueous dispersions which are essentially free from protective colloids or emulsifiers, comprising in dispersed form A. a polyurethane (A) comprising hydrophilic groups, which bring about the water-dispersibility of the polyurethane, this polyurethane (A) being essentially free from C—C double bonds, and B. a prepolymer having a content of from 0.1 to 1 mol of free-radically polymerizable C—C double bonds per 100 g of prepolymer.

The invention also relates to processes for their preparation and to their use for coating articles.

Aqueous dispersions which can be used to give articles a surface which is resistant to mechanical stress and which withstands attacks by solvent, by coating these articles with the dispersion and then curing the coating by irradiation with light, are widely known.

For this purpose, DE-A-40 31 732 recommends aqueous dispersion mixtures where one component of the mixture is a dispersion of a polyurethane having hydrophilic groups which allow the polyurethane to be dispersed even in the absence of dispersing auxiliaries. The other dispersion comprises a dispersed prepolymer having free-radically polymerizable C—C double bonds, this prepolymer being self-dispersible or being dispersed with the aid of emulsifiers or protective colloids.

DE-A-42 28 713 discloses radiation-curable binders. To prepare them it is recommended to disperse, in water, a mixture of a polyurethane which carries anionic groups and, as free-radically polymerizable double bonds, (meth) acryloyl groups, and a radiation-curable binder which contains (meth)acrylate groups. In this case the polyurethane serves as emulsifier.

DE-A-39 00 257 describes mixtures comprising polyurethanes modified with hydrophilic groups and with free-radically polymerizable double bonds, and free-radically curable synthetic resins (e.g. (meth)acryloyl-containing polyurethanes), and their dispersion in water.

These known, aqueous, radiation-curable dispersions, however, have inadequate stability on storage, or the irradiated or nonirradiated coatings prepared from these dispersions are still in need of improvement as far as properties such as hardness, chemical resistance, flexibility, adhesion to the substrate, sandability and surface quality are concerned, especially when they are extended with other polymer dispersions, for example styrene-acrylate or styrene-butadiene dispersions.

The properties of the nonirradiated coatings are likewise of importance, since on articles of complex geometry not every area is reached to a sufficient extent by the radiation which brings about the curing of the coating. Although the mechanical properties of the nonirradiated coatings cannot match the high level of the irradiated coatings, the former should at least be dust-dry and firm to the touch. In this respect too the known dispersions are still in need of improvement.

It is an object of the present invention, therefore, to remedy the deficiencies described above.

We have found that this object is achieved by the aqueous dispersions defined at the outset.

The polyurethane component (polyurethane A) of the molecular mixture is preferably composed of a) diisocyanates having 4 to 30 carbons,
b) diols of which
   b1) from 10 to 100 mol-%, based on the overall amount of the diols (b), have a molecular weight of from 500 to 5000 and
   b2) from 0 to 90 mol-%, based on the overall amount of the diols (b), have a molecular weight of from 60 to 500 g/mol,
c) monomers, other than the monomers (a) and (b), which have at least one isocyanate group or at least one group which is reactive toward isocyanate groups, and which additionally carry at least one hydrophilic group or a potentially hydrophilic group, so as to bring about the water-dispersibility of the polyurethanes,
d) if desired, further polyfunctional compounds, other than the monomers (a) to (c), which have reactive groups which are alcoholic hydroxyls, primary or secondary aminos or isocyanate groups, and
e) if desired, monofunctional compounds, other than the monomers (a) to (d), which have a reactive group which is an alcoholic hydroxyl, a primary or secondary amino or an isocyanate group.

Suitable monomers (a) are the aliphatic or aromatic diisocyanates customarily employed in polyurethane chemistry. Preference is given to the monomers (a) or mixtures thereof, which are also mentioned as monomers (a) in DE-A-195 21 500.

Suitable monomers (b) and (d) are preferably those specified as monomers (b) and (d) in DE-A-195 21 500.

In order to make the polyurethanes dispersible in water, they are composed in addition to components (a), (b) and (d) of monomers (c), which are different from the components (a), (b) and (d) and carry at least one isocyanate group or at least one group which is reactive toward isocyanate groups and, furthermore, a hydrophilic group or a group which can be converted into hydrophilic groups. In the following text the term "hydrophilic groups or potentially hydrophilic groups" is abbreviated to "(potentially) hydrophilic groups". The (potentially) hydrophilic groups react with isocyanates substantially more slowly than do the functional groups of the monomers used to construct the polymer main chain.

Preferred monomers (c) are likewise those referred to as monomers (c) in DE-A-195 21 500.

The proportion of components having (potentially) hydrophilic groups among the overall amount of components (a), (b), (c), (d) and (e) is generally such that the molar amount of (potentially) hydrophilic groups, based on the amount by weight of all monomers (a) to (e), is from 80 to 1200, preferably from 140 to 1000 and, with particular preference, from 200 to 800 mmol/kg.

The (potentially) hydrophilic groups can be nonionic or, preferably, (potentially) ionic hydrophilic groups. It is preferred to operate without effective amounts of nonionic groups.

The content of nonionic hydrophilic groups, if included, is in general up to 5, preferably up to 3 and, with particular preference, up to 1% by weight, based on the amount by weight of all monomers (a) to (e).

Monomers (e), which can be used if desired, are monoisocyanates, monoalcohols and mono-primary and -secondary amines. In general their proportion is not more than 10 mol-%, based on the overall molar amount of monomers. These monofunctional compounds usually carry further functional groups, such as carbonyls, and are used to introduce functional groups into the polyurethane which allow dispersion or crosslinking or other polymer-analogous reaction of the polyurethane.

Monomers containing at least one isocyanate group or at least one group which is able to react with isocyanate groups in an addition or condensation reaction, and also C—C double bonds, are employed not at all or only in insignificant amounts, i.e. only in amounts such that the properties of the end product are not thereby influenced.

In the field of polyurethane chemistry it is widely known how to adjust the molecular weight of the polyurethanes by choosing the proportions of the co-reactive monomers and the arithmetic mean of the number of reactive functional groups per molecule.

Normally, components (a) to (e) and their respective molar amounts are chosen so that the ratio A:B, where A) is the molar amount of isocyanate groups and B) is the sum of the molar amount of the hydroxyls and the molar amount of the functional groups which are able to react in an addition reaction with isocyanates, is from 0.5:1 to 2:1, preferably from 0.8:1 to 1.5 and, with particular preference, from 0.9:1 to 1.2:1. With very particular preference the ratio of A to B is as close as possible to 1:1.

Furthermore, the proportion of monomers (a) is preferably chosen so that the proportion of the monomers (a) among the monomers (a) to (e) is from 20 to 70% by weight.

The monomers (a) to (e) which are employed carry, as an arithmetic mean, usually from 1.5 to 2.5, preferably from 1.9 to 2.1 and, with particular preference, 2.0 isocyanate groups and/or functional groups which are able to react with isocyanates in an addition reaction.

The polyaddition of components (a) to (e) takes place in general at from 20 to 180° C., preferably from 50 to 150° C., under atmospheric pressure or under the autogenous pressure.

The reaction times required may extend from a few minutes to a number of hours. In the field of polyurethane chemistry it is known how to influence the reaction by a large number of parameters, such as temperature, monomer concentration, monomer reactivity.

To accelerate the reaction of the isocyanates it is possible to use the customary catalysts, such as dibutyltin dilaurate, tin(II) octoate or diazabicyclo[2.2.2]octane.

Suitable polymerization apparatus comprises stirred vessels or the otherwise customary polymerization apparatus.

Preferred solvents are of infinite miscibility with water, have a boiling point of 40 to 100° C. under atmospheric pressure, and react slowly if at all with the monomers.

The dispersions are in most cases prepared by one of the following processes:

In the acetone process, an ionic polyurethane is prepared from components (a) to (c) in a water-miscible solvent which boils at below 100° C. under atmospheric pressure. Water is added until a dispersion is formed in which water is the coherent phase.

The prepolymer mixing process differs from the acetone process in that rather than a fully reacted (potentially) ionic polyurethane it is a prepolymer containing isocyanate groups which is prepared first of all. In this case the components are chosen such that the above-defined ratio A:B is greater than 1.0 to 3, preferably from 1.05 to 1.5. The prepolymer is first dispersed in water and then crosslinked, possibly by reacting the isocyanate with amines which carry more than 2 amino groups which are reactive toward isocyanates, or is chain-extended with amines which carry 2 amino groups which are reactive toward isocyanates. Chain extension also takes place when no amine is added. In this case, isocyanate groups are hydrolyzed to amine groups, which react with residual isocyanate groups of the prepolymers and so extend the chain.

If a solvent has been used in preparing the polyurethane, it is usual to remove the majority of the solvent from the dispersion, for example by distillation under reduced pressure. The dispersions preferably have a solvent content of less than 10% by weight and are, with particular preference, free from solvents.

Also dispensed with is the use of customary dispersing auxiliaries, i.e. emulsifiers or protective colloids, in effective amounts. If such dispersing auxiliaries are used at all, the amounts are less than 10, preferably less than 5, and, with particular preference, less than 3% by weight, based on the prepolymers (B).

Examples of suitable prepolymers (B) are those referred to in DE-A-40 31 732, and therein as component (B), or in DE-A-196 02 071, but with the exception of those which are self-emulsifiable. This means that they are essentially free from hydrophilic groups, such as ionic groups, or nonionic hydrophilic groups such as polyethylene oxide units.

In the case of the prepolymers (B) the polymer main chain is formed by ester, ether or urethane repeating units. They contain in general from 0.1 to 1, preferably from 0.1 to 0.5 mol of free-radically polymerizable double bonds per 100 g of prepolymer (B), with particular preference being given to methacryloyl or acryloyl groups.

The prepolymers (B) possess in general a number-average molecular weight of from 300 to 10,000, preferably from 300 to 3000 and, with particular preference, from 300 to 1500. The molecular weights can be determined, for example, by gel permeation chromatography (GPC) against a polystyrene standard.

The prepolymers (B) are employed without solvent or with a solvent content of less than 30% by weight.

The weight ratio of polyurethane (A) to prepolymer (B) is judiciously from 0.3:1 to 99:1, preferably from 1:1 to 99:1 and, with particular preference, from 2:1 to 20:1.

The prepolymer is preferably added to the polyurethane (A) or to its prepolymer before dispersing. However, it is also possible first to prepare an aqueous dispersion of a polyurethane (A) and then to mix this dispersion, at any desired point in time prior to the use of the dispersion, with the prepolymer (B), for example by stirring the prepolymer (B) into the aqueous dispersion.

It is assumed that the polyurethane (A) and the prepolymer (B) are present in the dispersion in the form of a molecular mixture and not in the form of a dispersion containing in one discontinuous phase only the polyurethane (A) and in a further discontinuous phase the prepolymer (B).

The dispersions generally have a solids content of from 20 to 70, preferably from 25 to 60 and, with particular preference, from 35 to 45% by weight. The viscosity is usually from 10 to 1000 mPas, measured at 23° C. and at a shear rate of 250 s$^{-1}$.

The dispersions generally contain less than 10% by weight of solvent and with preference are virtually solvent-free.

The novel dispersions can comprise customary commercial auxiliaries and additives, such as wetting agents, antifoams, matting agents, emulsifiers, photoinitiators, thickeners and thixotropic agents, and colorants such as dyes and pigments.

Furthermore, these dispersions can be blended with other aqueous polymer dispersions, the solids content of such dispersions relative to the solids content of the novel dispersions being from 1:10 to 10:1.

These blending dispersions are, for example, generally known dispersions of copolymers of olefins, methacrylates or acrylates, such as styrene-butadiene or styrene-acrylate copolymers, or a customary polyurethane dispersion.

EXAMPLES

Abbreviations
  RT=room temperature
  MW=molecular weight
  p=parts

A. Preparing the dispersions

Dispersion 1

400 p of polyester diols of MW 2000 (from adipic acid and isophthalic acid in a molar ratio of 1:1 and 1,6-hexanediol), 89.9 p of dimethylolpropionic acid, 117.9 p of ethylene glycol and 499.8 p of an isomer mixture of tolylene diisocyanate (about 80% 2,4 and 20% 2,6 isomer) were reacted in 550 p of methyl ethyl ketone at 90° C. for 4 h. Then 0.4 p of dibutyltin dilaurate, 0.5 p of dimethylhydroquinone and 374 p of Laromer® LR 8945 (polyether acrylate resin containing about 5.6 mol of C—C double bonds per kg, from BASF AG) were incorporated into the polyurethane solution, and reaction was continued at 90° C. for a further 2 h. The prepolymer solution was diluted by adding 550 p of acetone and cooled. The isocyanate content was 0.14% by weight. At 30° C., 53.6 p of a 50% strength aqueous sodium hydroxide solution were added. 2400 p of deionized water were added for dispersing. Removal of solvents gave a transparent, virtually clear and pale yellowish dispersion having a solids content of 36.5%, a pH of 8.0 and a flow time of 115 s.

Dispersions 2 to 5

Dispersions 2 to 5 were prepared by the method of dispersion 1, as indicated in Table 1, with different amounts of Laromer LR 8945.

Dispersion 6

Dispersion 6 represents a variant of dispersion 3 and 4 in which dilution with acetone was carried out after the first reaction stage and only then was the Laromer LR 8945 added. Dibutyltin dilaurate and dimethylhydroquinone were not added.

Dispersion 7

Dispersion 7 represents a variant of dispersion 6, in which acetone was used instead of methyl ethyl ketone as the solvent for the first reaction stage. The reaction was conducted under autogenous pressure in a metal reactor.

Dispersion 8

400 p of polyester diol of MW 2000 (from adipic acid and isophthalic acid in a molar ratio of 1:1 and 1,6-hexanediol), 62.4 p of dimethylolpropionic acid, 72.1 p of 1,4-butanediol and 356.8 p of isophorone diisocyanate were reacted in 50 p of methyl ethyl ketone at 90° C. for 3 h. The prepolymer solution was diluted by adding 500 p of acetone and cooled. The isocyanate content was 0.86% by weight. Subsequently, 469 p of Laromer LR 8945, 33.2 p of N,N-dimethylethanolamine, 1400 p of deionized water and 9.6 p of diethylenetriamine (dissolved in 50 p of deionized water) were admixed in succession at 30° C.

Dispersion 9

Dispersion 9 was prepared by the method of dispersion 8 from the following starting materials: 400 p of polyester, 67.1 p of DMPA, 144.2 p of 1,4-butanediol, 551.3 p of isophorone diisocyanate, 300 p of Laromer LR 8945, 32 p of a 50% strength aqueous sodium hydroxide solution and 12.4 p of diethylenetriamine (dissolved in 50 p of deionized water).

B. Preparing the Coating Materials

The dispersions were investigated for their suitability for the UV coating application. In each case 3% by weight of the photoinitiator Irgacure® 500 (from Ciba-Geigy), based on solids, was incorporated into the dispersion.

B.1 Coatings on a Glass Plate

A film of the dispersions was applied to a glass plate using a 200 μm slotted doctor blade. The film was dried at room temperature for about 5 to 10 minutes. The film was then treated in a drying oven at 60° C. for 2 to 20 minutes.

The films physically dried in this way were exposed by means of a medium-pressure mercury lamp (120 watts/cm) with a dose divided according to wavelength of about 550 mJ/cm$^2$ (320–390 nm), 484 mJ/cm$^2$ (280–320nm), 50 mJ/cm$^2$ (250–260 nm) and 240 mJ/cm$^2$ (395–445 nm).

The test results are set out in Tab.2.

B.2 Coatings on Wood

The dispersions and auxiliaries indicated in Table 3 were mixed. The mixture was applied to wood using a SATA-jet flowcup gun having a nozzle of 1.3 and 1.6 mm respectively. The operating pressure was about 2 to 2.5 bar. In each case two coats of about 10 to 40 g/m$^2$ were applied. Between the first and the second coat the film was dried (2 minutes at 45° C. with a circulating-air dryer and 2 minutes at 60° C. with a nozzle dryer), and then exposed under the same conditions as described for B.1. Before applying the second coat, the first coat was sanded (coarseness about 240). The second coat was dried and exposed as for the first.

The test results are set out in Tab. 3.

C. Test Methods

Surface Hardness

The surface hardness was determined in accordance with DIN 53157 using a König instrument. In the tables, the number of double strokes (DS) is shown.

Erichsen Indentation

The test was carried out in accordance with ISO 1520.

Adhesion Test

The adhesion test took place with a crosshatch device in accordance with DIN-EN-ISO 2409.

Chemical Resistance

Testing for chemical resistance was carried out in accordance with DIN 68 861. However, only 10 test media were used from the overall selection, and stress group 1b was set up accordingly. The specific test media used were sodium carbonate, red wine, coffee powder, blackcurrant juice, ethyl butyl acetal, mustard, lipstick, disinfectant, ballpoint pen paste and cleaner (0=best rating).

Degree of Gloss

The degree of gloss was determined in accordance with DIN 67 530 at an incident/exit angle of 60°.

Storage Stability

The samples were stored at RT and 60° C. for up to 3 months and examined at regular intervals of 7 days. For examination, the samples were applied to a glass plate using a doctor blade, and the film was assessed for clouding and bittiness. Testing was also carried out to ascertain whether the viscosity remained constant. Table 1 indicates up to how many weeks the viscosity remained constant and the dispersion remained free from bits.

Compatibility

The dispersions were blended in a ratio of 2:1, based on solids content, with the following dispersions (commercial products from BASF AG) and tested for their storage stability (methods as described under "storage stability") and then tested as to whether the dried films were free from defects:

Acronal® 290 D (styrene-acrylate dispersion)
Luhydran® LR 848 S (acrylate dispersion)
Styronal® 8736 X (styrene-butadiene dispersion)

Viscosity

The flow time in seconds was determined in accordance with DIN 53 211 from a DIN 4 cup.

Appearance

The dispersions were knife-coated onto glass plates and examined visually for the presence of defects such as pinholes and craters. When none were present, the dispersions were assessed as "satisfactory" (sat.).

TABLE 1

Preparation and properties of the binder dispersions

| Dispersion | 1 | 2 | 3 | 4 | 5 | 6 | 7 | 8 | 9 |
|---|---|---|---|---|---|---|---|---|---|
| Resin content [% by wt.] | 25 | 20 | 15 | 15 | 10 | 15 | 15 | 33 | 20 |
| NCO content after dilution [%] | 0.14 | 0.06 | 0.23 | 0.55 | 0.4 | 0.58 | 0.39 | 0.86 | |
| Appearance | transparent yellowish | transparent yellowish | transparent yellowish | transparent yellowish | transparent yellowing | transparent yellowish | transparent yellowish | transparent colorless | transparent colorless |
| Solids content [% by wt.] | 36.5 | 36.1 | 34.1 | 36.2 | 37 | 33.6 | 40.3 | 38.2 | 35.8 |
| pH | 8.0 | 7.8 | 7.4 | 8.0 | 8.0 | 8.0 | 7.4 | 7.8 | 8.0 |
| Flow time [s] | 115 | 50.8 | 74.4 | 206 | 188 | 64 | 133 | 41 | 80 |
| Storage stability [weeks] | 12 | 12 | 12 | 10 | 12 | | 12 | | |

The compatibility of dispersion 7 was still satisfactory after 12 weeks

TABLE 2

Performance test results

| Dispersion | 1 | 2 | 3 | 4 | 5 | 6 | 7 | 8 | 9 |
|---|---|---|---|---|---|---|---|---|---|
| Hardness before UV (DS) | 50 | 74 | 102 | 94 | 113 | 104 | 81 | 51 | 55 |
| Hardness after UV (DS) | 111 | 111 | 114 | 99 | 114 | 114 | 104 | 99 | 103 |
| Erichsen indentation before UV (mm) | 9.5 | 10 | 9.7 | 9.7 | 8.6 | 9.7 | 9.2 | 10 | 10 |
| Erichsen indentation after UV (mm) | 9.5 | 9.7 | 9.6 | 9.8 | 9.5 | 9.7 | 9.5 | 9.6 | 9.7 |
| Adhesion without cross-hatch (rating) | 0 | 0 | 0 | 0 | 0 | 0 | 0 | 0 | 0 |
| Adhesion with cross-hatch (rating) | 0 | 0.5 | 0 | 1.5 | 0 | 0.5 | 0.5 | 0 | 0 |
| Chemical resistance (rating) | 1.3 | 1.75 | 1 | 0.9 | 0.95 | 0.9 | 1 | 1.1 | 0.85 |
| Appearance | sat. | sat. | sat. | sat. | sat. | sat. | sat. | sat. | sat. |

TABLE 3

Preparation and testing of matt coating materials

| | | |
|---|---|---|
| Parts of dispersion 4 | 74.2 | — |
| Parts of dispersion 6 | — | 79.0 |
| Parts of Dehydran ® 1293* | 0.1 | 0.1 |
| Parts of Acematt ® TS 100** | 2.5 | 2.5 |
| Parts of Irgacure ® 184*** (50% strength in butyldiglycol) | 1.6 | 1.6 |
| Deionized water | 21.6 | 21.6 |
| Total | 100 | 100 |
| Solids content of matt coating material [% by wt.] | 29.4 | 30.1 |
| Flow time of matt coating material [s] | 21 | 21 |
| Gloss before UV [%] | 12.0 | 10.5 |
| Gloss after UV [%] | 13.6 | 10.0 |
| Chemical resistance before UV [rating] | 1.3 | 1.5 |
| Chemical resistance after UV [rating] | 0.8 | 0.9 |
| Sandability before UV | good | good |
| Sandability after UV | good | good |

*Antifoam from Henkel;
**Matting agent from Degussa;
***Photoinitiator from Ciba-Geigy.

We claim:

1. A water-dispersible polyurethane, which is essentially free from protective colloids or emulsifiers, comprising in dispersed form:
   A) a polyurethane (A) comprising hydrophilic groups, which effect the water-dispersibility of the polyurethane, the polyurethane (A) being essentially free from C—C double bonds; and
   B) a non self-dispersible radiation-curable prepolymer having a content of from 0.1 to 1 mol of free-radically polymerizable C—C double bonds per 100 g of prepolymer;
   wherein the polyurethane (A) and the prepolymer (B) are present a form comprising a molecular mixture and not in the form of a dispersion, containing in one discontinuous phase only the polyurethane (A) and in a further discontinuous phase the prepolymer (B).

2. The water-dispersible polyurethane of claim 1, wherein the weight ratio of polyurethane (A) to prepolymer (B) is from 0.3:1 to 99:1.

3. The water-dispersible polyurethane of claim 1, wherein the polyurethane (A) is made from monomers, comprising:
   a) diisocyanates having 4 to 30 carbons;
   b) diols of which
   b1) from 10 to 100 mol-%, based on the overall amount of the diols (b), have a molecular weight of from 500 to 5000; and
   b2) from 0 to 90 mol-%, based on the overall amount of the diols (b), have a molecular weight of from 60 to 500 g/mol;
   c) monomers, other than the monomers (a) and (b), which have at least one isocyanate group or at least one group which is reactive toward isocyanate groups, and which additionally carry at least one hydrophilic group or a potentially hydrophilic group, so as to effect the water-dispersibility of the polyurethanes;
   d) optionally, further polyfunctional compounds, other than the monomers (a) to (c), which have reactive groups which are alcoholic hydroxyls, primary or secondary aminos or isocyanate groups; and
   e) optionally, monofunctional compounds, other than the monomers (a) to (d), which have a reactive group which is an alcoholic hydroxyl, a primary or secondary amino or an isocyanate group.

4. The water-dispersible polyurethane of claim 3, where the proportion of the monomers (a) among the monomers (a) to (e) is from 20 to 70% by weight.

5. The water-dispersible polyurethane of claim 1, having a viscosity measured at 23° C. and at a shear rate of 250 s$^{-1}$, of from 10 to 1000 mPas.

6. A process for preparing the water-dispersible polyurethane of claim 1, which comprises:
   a) preparing a melt or solution containing the prepolymer (B) and the polyurethane (A) or a prepolymer thereof; and
   b) dispersing the melt or solution, prepared in step a), in water.

7. The process of claim 6, wherein the polyurethane prepolymer is reacted during or after dispersion to form the polyurethane.

8. A method of coating articles comprising wood, paper, textile, metal or plastic, which comprises:
   a) applying a film of the water-dispersible polyurethane of claim 1, to said articles; and
   b) exposing the film produced in step a) to light.

9. The method of claim 8, wherein the film produced in step a) is dried before step b).

10. A coated article, comprising wood, paper, textile, metal or plastic produced by the method of claim 8.

* * * * *

UNITED STATES PATENT AND TRADEMARK OFFICE
CERTIFICATE OF CORRECTION

PATENT NO. : 6,335,397 B1 Page 1 of 1
DATED : January 1, 2002
INVENTOR(S) : Kokel et al.

It is certified that error appears in the above-identified patent and that said Letters Patent is hereby corrected as shown below:

<u>Title page</u>,
Item [86], the PCT information should read:

-- [86]  PCT No.:       Pct/EP98/01943

§ 371 Date:    Oct. 15, 1999
  § 102(e) Date: Oct. 15, 1999

Signed and Sealed this

Fourth Day of June, 2002

Attest:

Attesting Officer

JAMES E. ROGAN
*Director of the United States Patent and Trademark Office*